(12) United States Patent
Wang et al.

(10) Patent No.: US 11,902,264 B2
(45) Date of Patent: Feb. 13, 2024

(54) PATH SELECTION FOR DATA PACKETS ENCRYPTED BASED ON AN IPSEC PROTOCOL

(71) Applicant: VMware LLC, Palo Alto, CA (US)

(72) Inventors: Yong Wang, Palo Alto, CA (US); Todd Sabin, Morganville, NJ (US); Weiqing Wu, Palo Alto, CA (US); Awan Kumar Sharma, Pune (IN); Jia Yu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/016,596

(22) Filed: Sep. 10, 2020

(65) Prior Publication Data
US 2021/0400029 A1 Dec. 23, 2021

(30) Foreign Application Priority Data
Jun. 22, 2020 (IN) .............................. 202041026251

(51) Int. Cl.
*H04L 9/40* (2022.01)
*H04L 43/0829* (2022.01)
(Continued)

(52) U.S. Cl.
CPC ...... *H04L 63/0485* (2013.01); *H04L 43/0829* (2013.01); *H04L 43/0864* (2013.01);
(Continued)

(58) Field of Classification Search
CPC ............. H04L 43/0829; H04L 43/0864; H04L 61/2514; H04L 61/2517; H04L 61/2578;
(Continued)

(56) References Cited

U.S. PATENT DOCUMENTS 6,711,152 B1 3/2004 Kalmanek et al.
7,068,667 B2 6/2006 Foster et al.
(Continued)

FOREIGN PATENT DOCUMENTS

CN 102801695 A 11/2012
CN 10677426 A 1/2020
(Continued)

OTHER PUBLICATIONS

Barker, Elaine et al., Guide to IPsec VPNs NIST SP 800-77r1, NIST, National Institute of Standards and Technology (NIST), Jun. 30, 2020, pp. 1-166.
(Continued)

*Primary Examiner* — Thomas J Dailey
(74) *Attorney, Agent, or Firm* — King Intellectual Asset Management

(57) ABSTRACT

A method for selecting between a plurality of paths for sending an encrypted packet from a source endpoint to a destination endpoint is provided. The method selects a first path of the plurality of paths for sending the encrypted packet from the source endpoint to the destination endpoint, each of the plurality of paths associated with a different one of a plurality of source ports, the encrypted packet being encrypted based on a security association established between the source endpoint and the destination endpoint in accordance with an IPSec protocol. The method further encapsulates, based on the SA having NAT-T enabled, the encrypted packet with a UDP header having a first source port associated with the first path. The method then transmits the encapsulated encrypted packet from the source endpoint to the destination endpoint via the first path.

22 Claims, 5 Drawing Sheets

(51) Int. Cl.

| | |
|---|---|
| *H04L 43/0864* | (2022.01) |
| *H04L 61/2592* | (2022.01) |
| *H04L 61/2578* | (2022.01) |
| *H04L 61/2517* | (2022.01) |
| *H04L 61/2514* | (2022.01) |
| *H04L 101/663* | (2022.01) |

(52) U.S. Cl.
CPC ...... *H04L 61/2514* (2013.01); *H04L 61/2517* (2013.01); *H04L 61/2578* (2013.01); *H04L 61/2592* (2013.01); *H04L 63/029* (2013.01); *H04L 63/0236* (2013.01); *H04L 63/0272* (2013.01); *H04L 63/164* (2013.01); *H04L 63/18* (2013.01); *H04L 63/061* (2013.01); *H04L 2101/663* (2022.05)

(58) Field of Classification Search
CPC ............. H04L 61/2592; H04L 61/6063; H04L 63/0236; H04L 63/0272; H04L 63/029; H04L 63/0485; H04L 63/061; H04L 63/164; H04L 63/18

See application file for complete search history.

(56) References Cited

U.S. PATENT DOCUMENTS

| | | | |
|---|---|---|---|
| 8,671,176 | B1 | 3/2014 | Kharitinov et al. |
| 2002/0145981 | A1 | 10/2002 | Klinker et al. |
| 2002/0150229 | A1 | 10/2002 | Riihinen et al. |
| 2006/0227807 | A1* | 10/2006 | Jakubik ............... H04L 61/2517 370/466 |
| 2007/0283024 | A1 | 12/2007 | Landrum et al. |
| 2009/0231999 | A1 | 9/2009 | Verma |
| 2010/0138560 | A1* | 6/2010 | Kivinen ............... H04L 67/2842 709/246 |
| 2011/0035740 | A1 | 2/2011 | Powell et al. |
| 2011/0302346 | A1 | 12/2011 | Vahdat et al. |
| 2012/0303949 | A1 | 11/2012 | Liu et al. |
| 2013/0100816 | A1 | 4/2013 | Bergamasco et al. |
| 2014/0047252 | A1 | 2/2014 | Ansari et al. |
| 2016/0135074 | A1 | 5/2016 | Welin et al. |
| 2016/0277953 | A1 | 9/2016 | Andersson et al. |
| 2017/0295100 | A1 | 10/2017 | Hira et al. |
| 2017/0295101 | A1 | 10/2017 | Hira et al. |
| 2017/0374025 | A1 | 12/2017 | Pan |
| 2018/0062875 | A1 | 3/2018 | Tumuluru |
| 2018/0063743 | A1 | 3/2018 | Tumuluru et al. |
| 2018/0131617 | A1 | 5/2018 | Hira |
| 2019/0104075 | A1 | 4/2019 | Li et al. |
| 2019/0173850 | A1 | 6/2019 | Jain et al. |
| 2019/0288948 | A1 | 9/2019 | Hira et al. |
| 2020/0351254 | A1 | 11/2020 | Xiong et al. |
| 2021/0021523 | A1 | 1/2021 | Wang et al. |

FOREIGN PATENT DOCUMENTS

| | | |
|---|---|---|
| GB | 2493710 A | 2/2013 |
| KR | 20030013496 A | 2/2003 |
| WO | 2016020727 A1 | 2/2016 |

OTHER PUBLICATIONS

International Search Report and Written Opinion dated Apr. 8, 2022 for International Application No. PCT/US2022/0011726.
Al-Fares, Mohammad et al., Hedera: Dynamic Flow Scheduling for Data Center Networks, NSDI 2010, Berkeley, CA, USA, p. 19, USENIX Association.
Alizadeh, Mohammad et al., CONGA: Distributed Congestion-Aware Load Balancing for Datacenters, SIGCOMM'14, Aug. 17-22, 2014, ACM.
Alizadeh, Mohammad et al., Data Center TCP (DCTCP), SIGCOMM'10, Aug. 30-Sep. 3, 2010, ACM.
Alizadeh, Mohammad et al., On the Data Path Performance of Leaf-Spine Datacenter Fabrics, IEEE 21st Annual Symposium on High-Performance Interconnects, 2013, pp. 71-74.
Alizadeh, Mohammad et al., pFabric: Minimal Near-Optimal Datacenter Transport, SIGCOMM'13, Aug. 12-16, 2013, ACM.
Athanasopoulou, Eleftheria et al., Backpressure-based Packet-by-Packet Adaptive Routing in Communication Networks, IEEE/ACM Trans. Netw., vol. 21, Feb. 2013, pp. 244-257.
Awerbuch, Baruch et al., A Simple Local-Control Approximation Algorithm for Multicommodity Flow, Proceedings of the 34th IEEE Conf. on Found. of Computer Science, Oct. 1993.
Bai, Wei et al., Information-Agnostic Flow Scheduling for Commodity Data Centers, NSDI'15, 2015, pp. 455-468, USENIX Association.
BCM56850: High-Capacity StrataXGS Trident II Ethernet Switch Series, Broadcom, retrieved on Aug. 25, 2017 from the Internet at <URL: http://www.broadcom.com/products/Switching/Data-Center/BCM56850-Series>.
Benson, Theophilus et al., MicroTE: Fine Grained Traffic Engineering for Data Centers, CoNEXT 2011, Dec. 6-9, 2011, ACM.
Bosshart, Pat et al., Forwarding Metamorphosis: Fast Programmable Match-Action Processing in Hardware for SDN, SIGCOMM'13, Aug. 12-16, 2013, ACM.
Bosshart, Pat et al., P4: Programming Protocol-Independent Packet Processors, ACM SIGCOMM Computer Communication Review, Jul. 2014, 44:3, pp. 88-95.
Cao, Jiaxin et al., Per-packet Load-balanced, Low-Latency Routing for Clos-based Data Center Networks, CoNEXT'13, Dec. 9-12, 2013, pp. 49-60, ACM.
Cao, Zhiruo et al., Performance of Hasing-Based Schemes for Internet Load Balancing, IEEE Infocom, 2000, pp. 332-341.
Cavium and Xpliant Introduce a Fully Programmable Switch Silicon Family Scaling to 3.2 Terabits per Second, News & evnet, retrieved on Aug. 24, 2017 from the Internet at <URL: http://tinyurl.com/nzbqtr3>.
Chowdhury, Mosharaf et al., Efficient Coflow Scheduling with Varys, SIGCOMM'14, Aug. 17-22, 2014, ACM.
Cisco's Massively Scalable Data Center, Sep. 2015, retrieved from <URL: http://www.cisco.com/c/dam/en/US/td/docs/solutions/Enterprise/Data_Center/MSDC/1-/MSDC_AAG_1_pdf>.
Elwalid, Anware et al., MATE: MPLS Adaptive Traffic Engineering, IEEE Infocom, 2001.
Encapsulating Ipsec ESP in UDP for Load-balancing.
Farrington, Nathan et al., Data Center Switch Architecture in the Age of Merchant Silicon, 17th IEEE Symposium on High Performance Interconnects, 2009.
Greenberg, Albert et al., VL2: A Scalable and Flexible Data Center Network, SIGCOMM'09, Aug. 17-21, 2009, ACM.
Guo, Chuanxiong et al., Bcube: A High Performance, Server-centric Network Architecture for Modular Data Centers, Bcube: A High Performance, Server-centric Network Architecture for Modular Data Centers, SIGCOMM'09, Aug. 17-21, 2009, pp. 63-74, ACM.
He, Keqiang et al., Presto: Edge-based Load Balancing for Fast Datacenter Networks, SIGCOMM'15, Aug. 17-21, 2015, ACM.
Hong, Chi-Yao et al., Achieving High Utilization with Software-Driven WAN, SIGCOMM'13, Aug. 12-16, 2013, pp. 15-26, ACM.
Hu, Shuihai et al., Explicit Path Control in Commodity Data Centers: Design and Applications, Proceedings of the 12th USENIX Symposium on Networked Systems Design and Implementaion (NSDI'15), May 4-6, 2015, pp. 15-28.
Jain, Sushant et al., B4: Experience with a Globally-Deployed Software Defined Wan, SIGCOMM'13, Aug. 12-16, 2013, ACM.
Jeyakumar, Vimalkumar et al., EyeQ: Practical Network Performance Isolation at the Edge, 10th USENIX Symposium on Networked System Design and Implementation (NSDI'13), 2013, pp. 297-311, USENIX Association.
Kandula, Srikanth et al., Dynamic Load Balancing Without Packet Reordering, ACM SIGCOMM Computer Communication Review, Apr. 2007, 37:2, pp. 53-62.
Kandula, Srikanth et al., Walking the Tightrope: Responsive Yet Stable Traffic Engineering, SIGCOMM'05, Aug. 21-26, 2005, ACM.
Kang, Nanxi et al., Optimizing the "One Big Switch" Abstraction in Software-Defined Networks, CoNEXT'13, Dec. 9-12, 2013, ACM.

(56) References Cited

OTHER PUBLICATIONS

Katta, Naga et al., HULA: Scalable Load Balancing Using Programmable Data Planes, SOSR'16, Mar. 14-15, 2016, ACM.

Mahalingam M. et al., Virtual extensible Local Area Network (VXLAN): A Framework for Overlaying Virtualized Layer 2 Networks over Layer 3 Networks, IETF RFC 7348, Aug. 2014.

Members of the p4 consortium, retrieved from ,URL: http://p4.org/join-us/>.

Michael, Nithin et al., HALO: Hop-by-Hop Adaptive Link-State Optimal Routing, IEEE/ACM Transactions on Networking, Dec. 2015, 23:6, pp. 1862-1875.

Mysore, Radhika Niranjan et al., PortLand: A Scalable Fault-Tolerant Layer 2 Data Center Network Fabric, SIGCOMM'09, Aug. 17-21, 2009, ACM.

Perry, Jonathan et al., Fastpass: A Centralized "Zero-Queue" Datacenter Network, SIGCOMM, 2014, pp. 307-318, ACM.

Popa, Lucian et al., FairCloud: Sharing The Network In Cloud Computing, HotNets-X, New York, NY, USA, 2011, pP. 22:1-22:6, ACM.

Protocol-independent Switch Architecture, Jun. 4, 2015, retrieved from <URL: http://schd.ws/hosted_files/p4workshop2015/c9/NickM-P4-Workshop-June-04-2015.pdf>.

Radhakrishnan, Sivasankar et al., Dahu: Commodity Switches for Direct Connect Data Center Networks.

Raiciu, Costin et al., Improving Datacenter Performance and Robustness with Multipath TCP, SIGCOMM'11, Aug. 15-19, 2011, pp. 266-277, ACM.

Sen, Siddhartha et al., Scalable, Optimal Flow Routing in Datacenters via Local Link Balancing, CoNEXT'13, Dec. 9-12, 2013, ACM.

Sivaraman, Anirudh, P4's action-execution semantics and conditional operators, Massachusetts Institute of Technology, retrieved from the Internet, <URL: https://github.com/anirudhSK/p$-semantics/raw/master/p4-semantics.Pdf.>.

Sivaraman, Anirudh et al., Packet Transactions: A Programming Model for Data-Plane Algorithms at Hardware Speed.

The P4 Language Specification, The P4 Language Consortium-Version 1.1.0, Nov. 18, 2015, pp. 109.

Zats, David et al., DeTail: Reducing the Flow Completion Time Tail in Datacenter Networks, SIGCOMM'12, Aug. 13-17, 2012, pp. 139-150, ACM.

U.S. Office Action dated Jun. 29, 2023, from related matter U.S. Appl. No. 17/815,594.

* cited by examiner

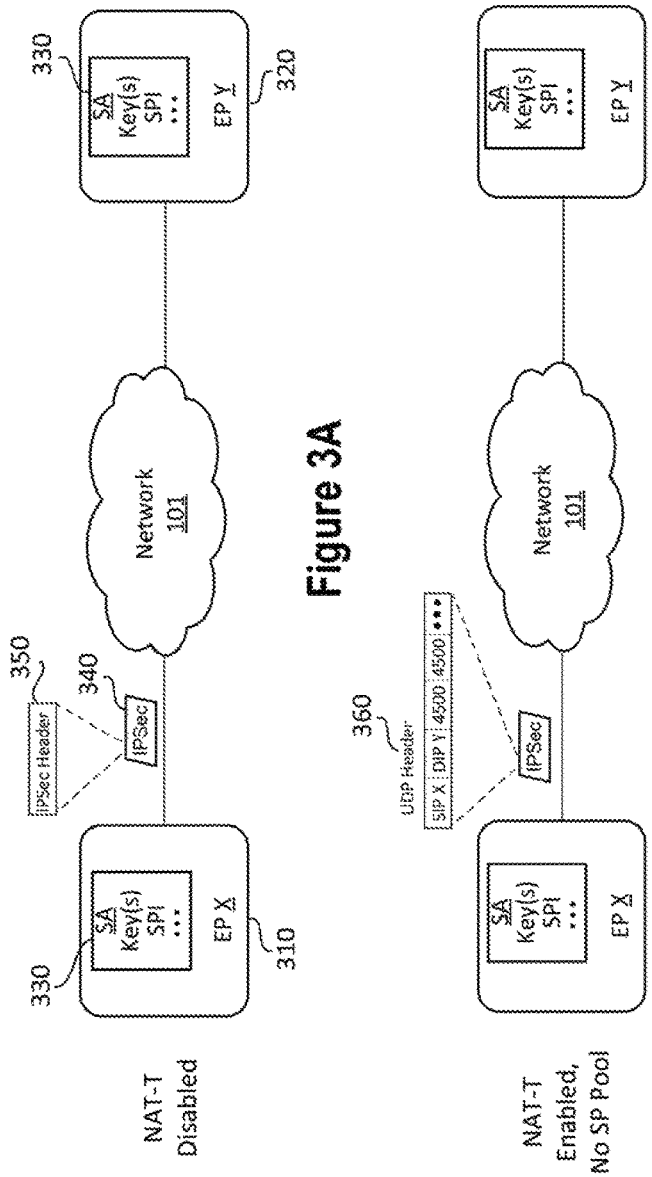
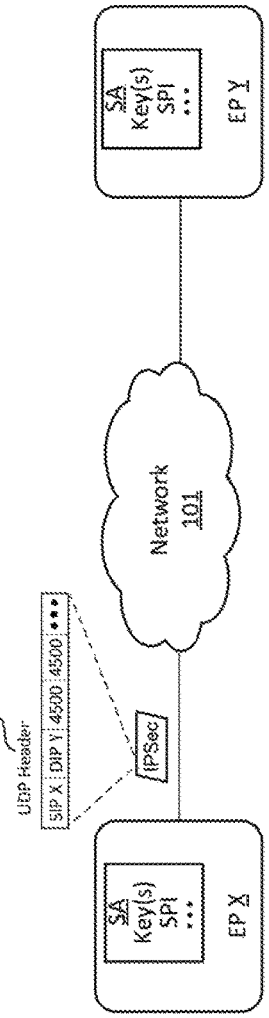
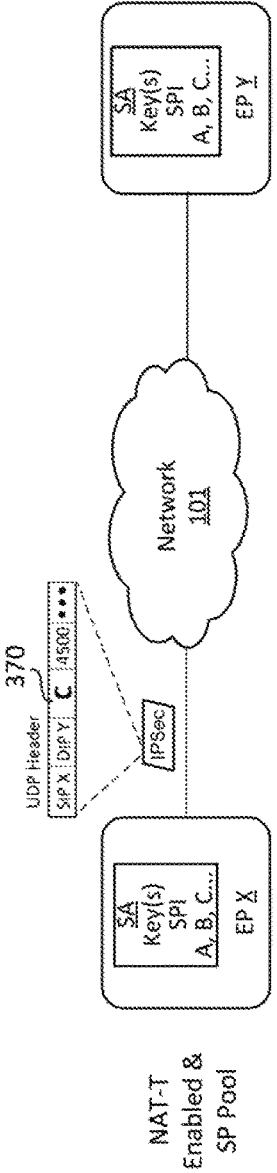
Figure 3A
Figure 3B
Figure 3C

PATH SELECTION FOR DATA PACKETS ENCRYPTED BASED ON AN IPSEC PROTOCOL

RELATED APPLICATIONS

Benefit is claimed under 35 U.S.C. 119(a)-(d) to Foreign Application Serial No. 202041026251 filed in India entitled "PATH SELECTION FOR DATA PACKETS ENCRYPTED BASED ON AN IPSEC PROTOCOL", on Jun. 22, 2020, by VMware, Inc., which is herein incorporated in its entirety by reference for all purposes.

BACKGROUND

Internet protocol (IP) security (IPSec) protocols are widely used to protect data packets communicated between endpoints, such as over the Internet, between gateways, between datacenters (e.g., on premises datacenters, cloud datacenters, etc.), within datacenters, etc. In order to securely exchange data packets (e.g., to encrypt the data packets), a security association (SA) may be established for each IPSec peer (e.g., endpoint). These security associations may be established between the endpoints by an Internet key exchange (IKE) module that manages and configures the encryption of data on each endpoint side. The configuration of SAs details how to exchange and protect information between the two endpoints. For example, each SA (at each IPSec endpoint) may include agreed-upon security parameters, such as encryption key(s), one or more security protocols, a security parameter index (SPI), etc. After SAs are established between the two endpoints, an IPSec protocol, such as an encapsulating security payload (ESP) protocol may be used to protect the data packets during the data exchange between the endpoints. For example, according to an ESP protocol, a source tunnel endpoint (TEP) encrypts and encapsulates packets (e.g., received from a source EP) by adding an IPSec header before sending the encapsulated encrypted packets to a destination TEP. The destination TEP then decapsulates and decrypts the received packets before forwarding them to a destination EP. The original packet header accordingly has addressing (e.g., IP addresses, ports, etc.) according to the source EP and destination EP, while the IPSec header has addressing according to the source TEP and destination TEP.

Since the source and destination IP addresses for IPSec encrypted packets in the IPSec header are the same (e.g., the source and destination IP addresses of the respective TEPs) for all EPs, the number of data forwarding/routing paths (may also be called paths or links hereinafter) between the two endpoints is limited. For example, when two endpoints deploy an IPSec tunneling overlay, the underlay (e.g., the physical network) may use an equal-cost multi-path (ECMP) routing approach to choose a path for a specific flow. The ECMP may select the paths based on a two-tuple (e.g., source and destination IP pair) hashing mechanism (e.g., since ESP packets, in some cases, do not include port numbers). When the two-tuple hashes are constant (e.g., always the IP addresses of the corresponding TEPs in the IPSec header), only one path can be selected at each endpoint side. Consequently, if a selected path fails (or slows down) (e.g., due to a networking problem, misconfiguration, etc.), the whole IPSec connectivity would also fail (or slow down), even if there are other available paths that can be used to route the IPSec traffic.

One solution to having a limited number of routing paths for the IPSec traffic is described in commonly owned U.S. patent application Ser. No. 15/654,588, titled "STEERING NETWORK FLOWS AWAY FROM CONGESTION AND HIGH LATENCY HOTSPOTS," filed on Jul. 19, 2017, now U.S. Pat. No. 10,666,729, the entire content of which is hereby incorporated by reference herein. Based on the solution described in the aforementioned patent application, extra FOU (foo over UDP) tunnel headers with different source ports are added to the IPSec packets for encapsulating the packets and assigning them to different tunnels to reach different paths, as the different source ports are used as part of the ECMP hashing mechanism to select a path. Based on this solution, additional workload for maintaining and managing the FOU tunneling is performed. The additional FOU tunnels will become part of the packet pipeline and routes need to be added/removed dynamically to switch between the different paths.

SUMMARY

Herein described are one or more embodiments of a method for selecting between a plurality of paths for sending an encrypted packet from a source endpoint to a destination endpoint. The method includes selecting a first path of the plurality of paths for sending the encrypted packet from the source endpoint to the destination endpoint, each of the plurality of paths associated with a different one of a plurality of source ports, the encrypted packet being encrypted based on a security association (SA) established between the source endpoint and the destination endpoint in accordance with an Internet Protocol (IP) Security (IPSec) protocol. The method further includes, based on the SA having network address translation traversal (NAT-T) enabled, encapsulating the encrypted packet with a user datagram protocol (UDP) header having a first source port associated with the first path. The method further includes transmitting the encapsulated encrypted packet from the source endpoint to the destination endpoint via the first path.

Also described herein are embodiments of a non-transitory computer readable medium comprising instructions to be executed in a computer system, wherein the instructions when executed in the computer system perform the method described above for selecting between a plurality of paths for sending an encrypted packet from a source endpoint to a destination endpoint. For example, the instructions may include code or one or more instructions for performing each step of the method.

Also described herein are embodiments of a computer system, wherein software for the computer system is programmed to execute the method described above for selecting between a plurality of paths for sending an encrypted packet from a source endpoint to a destination endpoint. For example, the computer system may include a processor coupled to a memory configured to perform each step of the method.

Also described herein are embodiments of a computer system comprising various means for executing the various steps of the method described above for selecting between a plurality of paths for sending an encrypted packet from a source endpoint to a destination endpoint.

BRIEF DESCRIPTION OF THE DRAWINGS

FIGS. 3A-3C are three block diagrams illustrating the changes in IPSec packet headers based on the changes in NAT-T status, according to example embodiments of the present application

DETAILED DESCRIPTION

Figure 1:
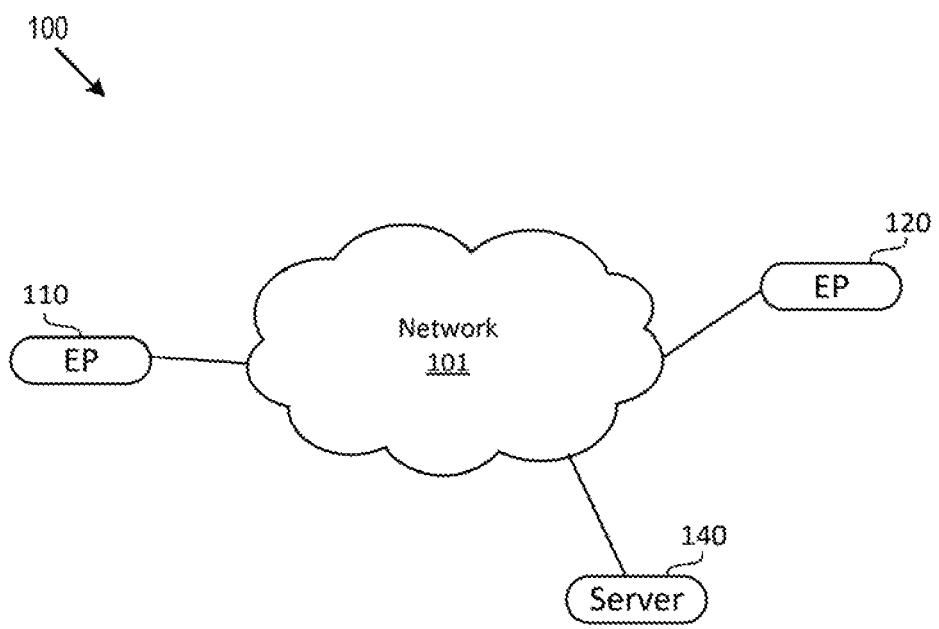
FIG. 1 is a block diagram illustrating two IPSec endpoints communicating with each other through a network, according to an example embodiment of the present application.

Leveraging IPSec protocols in data communication between two endpoints (e.g., across an IP network) may provide data authentication, integrity, and confidentiality. IPSec packets (e.g., packets that are encrypted based on an IPSec protocol) may be encrypted based on a security association (SA) established (e.g., by an internet key exchange (IKE) module) between the source and destination endpoints. For example, according to an IPSec protocol, a source EP (e.g., or TEP) may encrypt an IP packet with a mutually agreed-upon key defined by an SA between the source EP and the destination EP. The source EP may further encapsulate the encrypted packet (e.g., through a tunnel endpoint) by adding a new IP header and an IPSec protocol header (e.g., an ESP header) to the encrypted packet to generate an encapsulated encrypted packet.

As described, IPSec protocols provide confidentiality, authenticity, and integrity in data communications by encrypting packet payloads, as well as, in some cases, the packet headers. When a network address translation (NAT) device is on the routing path of a packet, the NAT device replaces the IP address of the packet (e.g., a private IP address) with a new IP address (e.g., a public IP address). As such, when an IPSec packet passes through a NAT device, the embedded address of the source endpoint within the IP payload may not match the source IP address of the IPSec packet (e.g., as defined in a corresponding SA) since it is replaced by a new IP address of the NAT device. This means breaking the authenticity and integrity offered by IPSec, which may cause the packet to be dropped by the destination endpoint. Additionally, based on the level of encryption, the headers of an IPSec packet may be encrypted. As such, it would not be possible for a NAT device to change these encrypted headers to its own IP addresses. In other words, having a NAT device in the middle of the routing path of an IPSec packet may cause data communication based on the security established between the endpoints to fail.

To resolve this issue, NAT Traversal (NAT-T) has been developed. NAT-T adds a user datagram protocol (UDP) header to the IPSec packets (e.g., encapsulates the IPSec packet headers with a UDP header). For example, an IPSec module running on a source EP is configured to encapsulate the packet with a UDP header. As the encapsulating UDP header is not encrypted, the encrypted packet may be treated just like a normal UDP packet. That is, a NAT device can make the required changes to the UDP packet (e.g., the encapsulated IPSec packets) and process them. Specifically, the NAT-T solution may encapsulate the IPSec packets inside UDP and assign both source and destination port numbers in the UDP header a fixed address that is known to the endpoints (e.g., port number 4500). After such a UDP encapsulation, there would be enough information for the NAT device to translate the IPSec packets successfully. For example, when a packet with source and destination ports of 4500 in the UDP header is sent through a NAT device, the NAT device may change the source port number from 4500 to a random port number, while keeping the destination port number of 4500. When a different NAT-T flow passes through the NAT device, it may also change the source port number of the flow from 4500 to a different random port number, and so on. This way, each endpoint may be able to maintain a unique database (e.g., table) entry in the NAT device that maps the endpoint's IP address and the port number 4500 (e.g., defined by UDP) to a NAT IP address (e.g., a public IP address) and a different port number.

Accordingly, some embodiments provide for path selection (e.g., as performed by a module, such as an IKE module, running on a source EP) that is capable of selecting among several different routing paths (e.g., instead of only one path) between a source IPSec endpoint and a destination IPSec endpoint. To do so, NAT-T may be enabled/activated, which is a feature supported by the IPSec protocols, to cause the IPSec module to encapsulate the IPSec packet headers with UDP headers. Conventionally, enabling IPSec's NAT-T may cause the source and destination ports in the UDP headers of the IPSec packets to be assigned a fixed address (e.g., port 4500). In some embodiments, IKE module maintains a pool of source port numbers at each endpoint side (e.g., associated with each SA at each endpoint side). By selecting a different source port number to include in the UDP header of an encapsulated IPSec packet, though the destination port number, source IP address, and destination IP address may remain the same, the hash of the tuple including the source port number may correspond to a different path for each different source port number. The IKE module may select a path by causing the IPSec module to replace the fixed source port number with, or originally including in the UDP header, a given source port number of the pool of source ports that is associated with the path.

To identify the various paths, some embodiments may involve the IKE module of the source EP probing paths by sending probing packets through the paths (e.g., by assigning a different source port associated with each path to the probing packet headers). The results of the probing may indicate statistics about each of the paths, such as latency, drop rate, bandwidth, jitter, etc. The IKE module may use such statistics to determine which path(s) (e.g., source port number(s)) is a suitable (e.g., most qualified) path for routing the IPSec traffic (or flow). After selecting a path (e.g., based on the probing), certain embodiments may involve the IPSec module of the source EP assigning the IPSec packets (e.g., encapsulating the IPSec packets with) the five-tuple (e.g., source IP, destination IP, source port, destination port, and protocol) associated with the selected path to route the IPSec packets to the destination EP via the selected path, such as by setting the source port number to the port number associated with the selected path.

In some embodiments, the IKE module of the source EP negotiates with the IKE module of the destination EP such that the destination EP is aware of which source port numbers are associated with which SA, so that the destination EP knows that an incoming packet is for the destination EP and associated with the SA.

In some embodiments, the IKE module of the source EP determines there are several qualified paths associated with several different source port numbers. In some embodiments, the IKE module of the source EP negotiates with the IKE module of the destination EP to determine which source port numbers associated with the source EP also provide suitable communication paths for communication from the destination EP to the source EP. For example, the IKE module of the destination EP may perform similar probing using the source port number of the source EP as the destination port number when replying to the source EP. Thus, the destination EP may similarly determine suitable paths associated with suitable port numbers for the source EP. Thus, each of the source and destination EPs may accordingly select one or more suitable source port numbers for the source EP and negotiate a suitable source port number(s) for the source EP. For example, a source EP may identify a first set of one or more qualified source port numbers for the source EP and a destination EP may also identify a second set of one or more qualified source port numbers for the source EP. The two EPs may negotiate their identified sets of source port numbers for the source EP (e.g., through a control plane established between their corresponding IKE modules) to select at least one source port number for the source EP that is in both sets of qualified source port numbers for the source EP.

Since the NAT-T leveraged by the above-described method is a feature inherently supported by the IPSec protocols, path selection, as described above, will be entirely transparent to the routing stack. Additionally, this way of path selection will be entirely independent of the underlay network and, at the same time, does not add any extra workload or overhead to the network. For example, there will be no need for additional tunneling protocols, such as FOU tunneling, to encapsulate the IPSec packets, thereby eliminating any overhead for managing the additional layer of tunneling.

In some embodiments, if the selected path is down or its quality deteriorates, the routing path may be switched to a better qualified path (e.g., associated with the same SA). In some such embodiments, the IKE module may periodically probe the paths and keep a list of qualified paths (e.g., list of source port numbers) for routing the IPSec traffic. If one path fails, the IKE module may easily replace it with another qualified path of the list. Additionally, in some embodiments, the IKE module may load-balance certain inner flows (e.g., different flows that are transmitted by the same endpoint) such that different flows can be routed through different paths. In some embodiments, the IPSec module may capture identification data that identifies to which inner flow a packet belongs before the packet is encrypted and add the captured flow identification data to the metadata of the packet (e.g., to the UDP header of the IPSec packet). This metadata may then be used, for example, during load balancing of the inner flows to assign the IPSec packets of each inner flow to a particular path.

FIG. 1 is a block diagram 100 illustrating two IPSec endpoints communicating with each other through a network, according to an example embodiment of the present application. As shown in FIG. 1, network 101 may connect several endpoints, such as endpoints 110 and 120, to each other and to other servers, such as server 140. Each endpoint (EP) may be a physical computing device (e.g., physical server, physical host). In some embodiments, an EP may be a virtualized computing instance (VCI) (e.g., a virtual machine (VM), a container, a data compute node (DCN), an isolated user space instance, etc.) as further discussed below. In some embodiments, an EP may also act as a tunnel endpoint (e.g., using a tunneling module) or may be connected to a separate tunnel endpoint (TEP) (not shown in the figure) to communicate the IPSec traffic (or flows) with the other EP (or TEP). In some cases, an EP (or TEP) may be referred to as an IPSec gateway and should not be confused with a Virtual Extensible Local Area Network (VXLAN) Tunnel Endpoint (VTEP).

EPs 110 and EP 120 may be connected to each other, for example, to stretch a network across geographically distant sites (e.g., datacenters). An EP refers generally to an originating EP ("source EP") or terminating EP ("destination EP") of a flow of network packets, which may include one or more data packets passed from the source EP to the destination EP. Network 101 may include, a direct link, a local area network (LAN), a wide area network (WAN), such as the Internet, a private network, a public network, another type of network, or a combination of one or more of the aforementioned networks.

In network system 100, as discussed above, EPs 110 and 120 may communicate with or transmit data packets to each through tunnel endpoints (TEPs), for example, according to the ESP protocol. EPs 110 and 120 (or TEPs) may implement IPSec protocols, such as ESP, to secure communication between one another. In some embodiments, before any data can be securely transferred between EPs 110 and 120 using the IPSec framework, the EPs may need to establish security associations (e.g., including a mutually agreed-upon key, one or more security protocols) between themselves. In some embodiments, the security associations may be established by TEPs on behalf of EPs 110 and 120.

The mutually agreed-upon key (e.g., encryption/decryption key), in some embodiments, is generated by a server (e.g., server 140) and subsequently distributed to EPs 110 and 120. The one or more security protocols, described above and below, may include one or more IPSec security protocols, such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPSec security protocols (e.g., AH protocol) alone or in combination with ESP, may be used in accordance with the embodiments described herein. Additionally, the embodiments described herein may similarly be used for different types of traffic such as IPv4, IPv6, etc. In certain embodiments, the techniques herein can be used to hash ESP packets encapsulated in other packet types (e.g., VXLAN or Geneve).

In addition to a mutually agreed-upon key and security protocol, a security association may include a security parameter index (SPI) value. In some embodiments, each SPI value is associated with a security association (SA), which enables the EPs to distinguish among multiple active security associations. As an example, SPI values may be used to distinguish between the inbound and outbound security associations of different EPs. In some cases, an Internet Key Exchange (IKE) module at each EP (or TEP) may generate the different SA parameters, such as these SPI values and encryption/decryption keys in the IPSec framework. For example, prior to any data exchange, the IKE module may perform a two-phase negotiation session, which may result in establishing two security associations between two IPSec peers. In some embodiments, an IKE module of each EP may communicate with the other IKE module of the other EP (e.g., through one or more control routes) to exchange the control plane data (e.g., the encryption keys, SPIs, etc.) and save them is their corresponding SAs. The SAs may not only contain mutually agreed-upon encryption and decryption keys to be used for incoming and outgoing traffic, but also maintain sequence numbers for each data transfer. These sequence numbers are maintained to ensure anti-replay, which may prevent unauthorized users (e.g., hackers) from injecting or making changes in the IPSec packets that travel between the source and destination IPSec EPs.

In some cases, instead of using IKE, distributed network encryption (DNE) may be utilized to simplify key management, including key generation and exchange, and SPI allocation. DNE may provide a central unit (e.g. server 140) that may generate and distribute the encryption/decryption keys and SPI values for EPs. DNE may also simplify the protection of network traffic by allowing users (e.g., network administrators) to define simple security rules and key policies. For example, in some embodiments, server 140 may store, in its memory, a plurality of security rules and key policies. Security rules may be user-defined rules that one or more users may input into the central unit through an interface (e.g., via a manager, which may be a physical computing device or a virtualized computing instance supported by a physical computing device). Security rules may define what key policy may be used by server 140 to generate an encryption/decryption key for data transfer between the EPs in network 101. In some embodiments, each key policy may be associated with one or more EPs and may include certain specifications (e.g., one or more of an algorithm, action, strength of the key, etc.) that define properties of an encryption/decryption key.

In some embodiments, after the security associations between the EPs are established, a source EP (e.g., EP 110) may enable the NAT-T feature of the IPSec protocol to implement a UDP tunneling protocol for transmitting the IPSec packets to the destination EP (e.g., EP 120). In other words, by activating the NAT-T, the IPSec encrypted packets will be encapsulated by UDP headers to include the source and destination IPs of the respective source and destination EPs (or TEPs), and also source and destination ports (e.g., conventionally ports 4500). As described above, NAT-T is an inherent feature of the IPSec protocol, and all the EP needs to do for enabling this feature is to set a corresponding parameter in its SA (e.g., is_natt flag parameter) in some embodiments.

It should be noted that, in some embodiments, the source EP may enable (or activate) NAT-T irrespective of the existence of a NAT device (or middlebox) on the routing path to the destination EP. That is, irrespective of the IPSec packets being translated (e.g., by a NAT device) or not, the EP of some embodiments may leverage the NAT-T mechanism to ensure the encapsulation of the IPSec packet headers by the UDP headers. As will be described in more detail below, such UDP encapsulation may enable creation (or identification) of multiple IPSec paths (e.g., associated with the same SAs) between the source and destination EPs.

Figure 2:
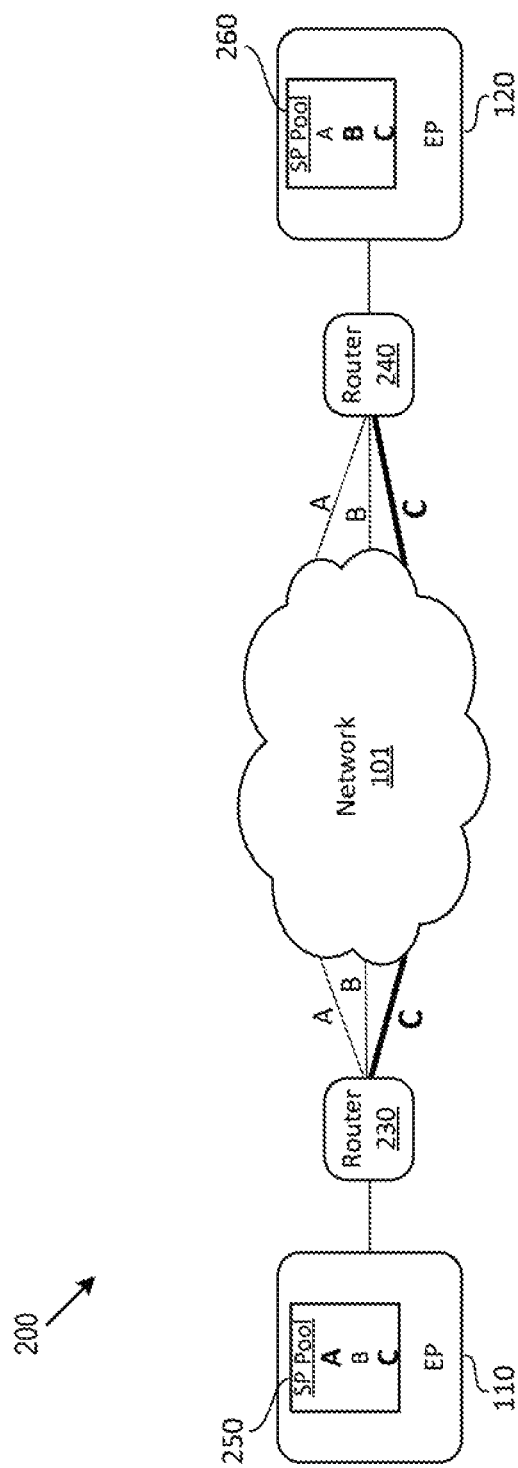
FIG. 2 is a block diagram illustrating the IPSec endpoints shown in FIG. 1 selecting a routing path among multiple paths for communicating the IPSec traffic, according to an example embodiment of the present application.

FIG. 2 is a block diagram 200 illustrating the IPSec endpoints shown in FIG. 1 selecting a routing path among multiple paths for communicating the IPSec traffic, according to an example embodiment of the present application. As shown in the figure, EPs 110 and 120 are in communication over network 101, and routers 230 and 240 forward the packets received from EPs 110 and 120 through network 101. Although shown as separate elements, routers 230 and 240 may be part of network 101. Network 101, as described above, may generally be a wide area network (WAN), such as the Internet, or a local area network (LAN), such as a network within a data center with multiple routers, or a combination of these networks with other private and/or public networks. In one embodiment, EPs 110 and 120 may be physical or virtual appliances.

Virtual appliances may include any type of VCI, such as VMs, with software appliances installed therein. For example, EPs 110 and 120 may be two VMs with the same datacenter or on separate datacenters. As an example, EPs 110 and 120 may be gateway virtual appliances in a hybrid cloud computing system, with one of the virtual appliance EPs running in the cloud and the other virtual appliance EP running in an on-premises data center. In such a case, clients in the cloud may connect to the EP running in the data center, and clients in the data center may connect to the EP running in the cloud, to communicate with each other. Alternatively, EPs 110 and 120 may be physical EPs. Although two EPs 110 and 120 are shown in the figure, it should be noted that techniques disclosed herein may also be employed with more than two EPs. Furthermore, EPs 110 and 120 are used herein as examples of endpoints, but it should be understood that techniques disclosed herein are also applicable to other types of endpoints, such as personal computers (PCs), smart phones, tablets, and the like.

As shown in FIG. 2, three ECMP paths A, B, and C between router 230 and router 240 may be used to route packets from EP 110 to EP 120 and vice versa. Further, though paths are shown as symmetrical for ease of illustration, it should be noted that paths from EP 110 as a source to EP 120 as a destination may be different than paths from EP 120 as a source to EP 110 as a destination. As will be discussed in more detail below, paths A, B, and C are three paths out of any number of paths that may be identified by EP 110 after the EP enables NAT-T. These paths may be identified by corresponding source port numbers in a source port pool (e.g., source port pool 250) associated with the SA between EP 110 as a source EP and EP 120 as a destination EP. ECMP is a routing strategy in which next-hop packet forwarding to a destination may occur over multiple "best paths" based on routing metric calculations. To balance traffic from EP 110 to EP 120 across paths A, B, and C, router 230 may compute a hash of certain fields of the packets it receives and distribute traffic flows to network links based on the calculated hash values. For example, a common hash that routers compute may be a five-tuple hash of a packet's source IP address, source port number, destination IP address, destination port number, and the network protocol used for the communication. Each such five-tuple may identify a traffic flow, and router 230 may distribute the traffic flows across paths A, B, and C based on the five-tuple hashes.

In some embodiments, EP 110 may be configured to activate/enable NAT-T (e.g., by setting an is_natt parameter in the SA) to enable the IPSec protocol to encapsulate the IPSec packets with UDP headers. In some embodiments, UDP headers may be used to wrap the IPSec packets, such that multiple UDP tunnels (or paths) are created between EP 110 and EP 120. In some embodiments, each UDP tunnel (e.g., each path A, B, or C) may provide bundling and abstraction of IPSec packets (or tunnels), requiring only one public IP address for the UDP tunnel on each side and permitting the IPSec tunnels to use private IP spaces.

In some embodiments, by enabling NAT-T, the UDP header of each IPSec packet may include the same source and destination IP addresses of the corresponding source and destination EPs (e.g., IP addresses of source EP 110 and destination EP 120), destination port number (e.g., port 4500), and the network protocol. After NAT-T is enabled, EP 110 may select from different source port numbers in source port pool 250 for selecting different routing paths for IPsec packets. Source port pool 250, as described in more detail below, with reference to FIG. 3, may be configured by an IKE module of EP 110. The IKE module may maintain one source port pool for each SA of EP 110. For example, if there are two different SAs established at EP 110 for two different IPSec communications with destination EP 120, or with two different destination EPs, the IKE module of EP 110 may include two different source port pools, each corresponding to one of the SAs.

EP 110 may measure the network metrics of one or more paths by forwarding probing packets through each path to destination EP 120 by setting source port numbers of the probing packets to different values associated with the one or more paths, such as to source port number values included in the source port pool 250. For example, for a first probing packet, EP 110 may assign IP address of EP 110, as the source IP address of the packet, IP address of EP 120, as the destination IP address of the packet, a first selected source port number from the source port pool 250, as the source port number of the packet, and destination port 4500, as the destination port number of the packet. In the illustrated example of FIG. 2, for probing the three paths, source EP 110 may forward one or more probing packets to EP 120 through path A by assigning, to the probing packets, the same IP addresses and destination port number, as described above, and source port A, as the source port number. Similarly, for probing path B, EP 110 may assign the same values to the same fields of the probing packets, and assign source port B as the source port number of the packets. For path C, in addition to using the same source and destination IP addresses, protocol, and destination port number, source port C may be used for the probing packets.

As discussed, routers, such as router 230, may compute hashes of packet header fields in order to distribute flows across ECMP paths. For example, router 230 may compute/calculate a five-tuple hash value of each of the probing packets (e.g., having the above-described source and destination IP and port numbers), with each calculated hash value mapping to a different path (e.g., paths A, B, or C), as a result of having the different source port numbers. In some embodiments, EP 110 may determine (e.g., via a traffic monitoring module) the performance metric(s) for each of the paths A, B, and C. The performance metric(s) may include one or more of latency, liveliness, throughput, packet loss, and latency drop, among other metrics. In some embodiments, probes, such as latency and liveliness, of each of the paths may be scheduled periodically and/or in response to certain events. Using the probes, EP 110 may determine which path is best qualified for carrying the IPSec packets to EP 120.

In some embodiments, EP 110 may rank the identified paths (e.g., paths A, B, and C) based on its last probing session (e.g., most recent probing). For example, EP 110 may rank path C as the best path, and paths B and A as the next qualified paths. In some such embodiments, in case there is a congestion in path C, EP 110 may continue routing of the IPSec packets by switching to path B for the subsequent IPSec packets of the same flow. This is possible, because all of the identified paths are associated with the same SA of the EP and as such, if one of the paths deteriorates, the EP may have the option to switch to other paths (e.g., to path B as the second best ranked path).

In some embodiments, each of the transmitter (or source) EP 110 and responder (or destination) EP 120 may do their own path identification and selection, as described above, separately. In some embodiments, EPs 110 and 120 may communicate with each other (e.g., through a control path established between the IKE modules of the EPs) and negotiate the most qualified source port number(s) between each other. For example, using the three source ports A, B, and C, EP 110 may determine that source port numbers A and C for EP 110 result in the most qualified paths for sending IPSec packets. Conversely, EP 120, using source pool 260 and router 240, may determine that source port numbers B and C for EP 110 result in the most qualified paths for IPSec packet transmission by EP 110. For example, EP 120 may forward probing packets to EP 110 using the source ports used by EP 110 as the destination ports for the probing packets. This way EP 120 may determine that if source port numbers B and C are used by EP 110, it may result in paths having less latency and packet drop than source port number A. After negotiating the source port numbers, EPs 110 and 120 may determine that overlapping source port number C is resulting in the most suitable path for transmitting the IPSec traffic to EP 120. As such, after the activation of NAT-T and the probing, EP 110 may use source port number C to transmit the IPSec packets to destination EP 120. How EP 110 uses source port number C for such transmission is described below, with reference to FIG. 3C.

Some embodiments may perform the above-described process to determine the most suitable (or qualified) path for EP 120 as the source EP to transmit IPSec packets to EP 110 as the destination EP. For example, similar to EP 110, EP 120 may forward the probing packets through router 240 to EP 110, and by probing the different paths based on the different source port numbers in source port pool 260 (e.g., associated with the SA between EP 120 as a source EP and EP 110 as a destination EP), EP 120 may realize that the most suitable source port is source port A. Source ports B and C may be ranked second and thirds most suitable source ports. Similarly, EP 110 (as the destination EP) may use the source ports used by EP 120 (as the source EP) in the destination port of its probing packets sent to EP 120. This way, EP 110 may also determine the ranking of the source ports to include source port B as the most suitable source port for EP 120 to transmit IPSec packets to EP 110. After communicating this information, for example, through the respective IKE modules of EPs 110 and 120, EP 120 may determine to transmit the IPSec packets to EP 110 using source port B.

FIGS. 3A-3C are three block diagrams illustrating the changes in IPSec packet headers based on the changes in NAT-T status, according to example embodiments of the present application. More specifically, FIG. 3A illustrates two endpoints communicating IPSec packets while NAT-T is disabled; FIG. 3B illustrates the same two endpoints communicating IPSec packets while NAT-T is enabled, but no source port pool is used; and FIG. 3C illustrates the two endpoints communicating IPSec packets while NAT-T is enabled and also a source port pool is used for identifying suitable routing path(s).

FIGS. 3A-3C include two endpoints 310 (X) and 320 (Y) exchanging IPSec traffic through network 101. Endpoints 310 and 320 may be the same as endpoints 210 and 220 described above, with reference to FIG. 2. Additionally, network 101 may be the same network 101 described in FIG. 2. As shown in FIG. 3A, the two endpoints 310 and 320 have established a secure communication using, for example, one of the IPSec protocols, as described above, with reference to FIG. 1. As such, each endpoint is keeping its corresponding IPSec configuration (e.g., encryption key, SPI, etc.) in its respective SA 330 (e.g., stored in a database associated with the SA of the corresponding endpoint).

FIG. 3A also shows that endpoint 310 (X) is sending an IPSec packet 340 to endpoint 320 through network 101.

IPSec packet may include an IPSec header 350 and an IPSec payload (not shown separately). As described above, with reference to FIG. 1, depending on the level of network security and/or the IPSec protocol used, either the payload, or both payload and header 350 may be encrypted, for example, using an encryption key of SA 330. As shown in the figure, since NAT-T is not enabled, packet header 350 is not encapsulated in any other protocol header. Therefore, as discussed, in case there is a NAT device anywhere on packet 340's route toward EP 320, the IPSec protocol may fail (e.g., because the source IP in packet header 350 may be replaced by another IP that is unknown to SA 330 of EP 320, and/or because packet header 350 is encrypted and the NAT device is unable to replace the IP address altogether).

FIG. 3B shows that endpoint 310 (X) is sending an IPSec packet 340 to endpoint 320 through network 101, while the NAT-T feature is enabled. As described above, with reference to FIG. 2, when NAT-T is enabled, IPSec packets may be automatically encapsulated in UDP headers (e.g., IPSec protocol itself handles the tunneling and no additional tunneling layer may be required). As such, UDP header 360 is added to the packet and the initially assigned IPSec header of the packet may now act as part of the payload after the encapsulation. As described above, UDP header 350 may include several header fields, such as source IP (SIP), destination IP (DIP), source port, destination port, and protocol. As shown in the figure, SIP address in packet header 360 is assigned "X" (the IP address of EP 310), DIP address is assigned "Y" (the IP address of EP 320), and the two source and destination ports are assigned fixed port number 4500.

Since NAT-T is enabled in FIG. 3B and UDP header 360 is added to packet 340, in case there is a NAT device anywhere on packet 340's route toward EP 320, the IPSec protocol will not fail, because the NAT device can now replace the IP address in the UDP header (e.g., SIP X) with another IP address (e.g., a public IP address) of the NAT device. However, whether a NAT device exists on the route or not, there will be only one routing path between the two EPs, and if, for any reason, the path gets congested, EP 310 may not be able to switch to another IPSec path.

FIG. 3C shows that endpoint 310 (X) is sending an IPSec packet 340 to endpoint 320 through network 101, while the NAT-T feature is enabled and also, a source port pool is part of the configuration of SA 330 (e.g., source port numbers A, B, and C are added to the source port pool). As described above, with reference to FIG. 2, not only is UDP header 360 is encapsulating the IPSec header, but EP 310 has performed a set of probing based on the source port numbers maintained in the source port pool and determined that path C corresponding to source port "C" is a suitable path for routing the IPSec packets. As such, SIP address in packet header 360 is assigned "X" (the IP address of EP 310), DIP address is assigned "Y" (the IP address of EP 320), source port number is set to source port "C" (associated with the selected path), and the destination port is assigned fixed port number 4500.

In FIG. 3C, since NAT-T is enabled (e.g., UDP header 360 is added to packet 340), in case there is a NAT device anywhere on packet 340's route toward EP 320, the IPSec protocol will not fail, because the NAT device can now replace the IP address in the UDP header (e.g., SIP X) with another IP address (e.g., a public IP address) of the NAT device. Additionally, whether a NAT device exists on the route or not, even though currently path C is selected for routing the packet, if this path gets congested, EP 310 may have other IPSec paths available to switch to, since multiple routing paths have been identified (e.g., paths A, B, and C) for the same SA session. For example, as discussed above, with reference to FIG. 2, EP 310 may have ranked the paths A, B, and C based on its last probing session, and may switch to path B (for subsequent IPSec packet routings), from path C, if path C gets congested.

As discussed above, in some embodiments, the source EP may enable (or activate) NAT-T irrespective of the existence of a NAT device (or middlebox) on the routing path to the destination EP. That is, irrespective of the IPSec packets being translated (e.g., by a NAT device) or not, the EP of some embodiments may leverage the NAT-T mechanism to ensure the encapsulation of the IPSec packet headers by the UDP headers. However, when there is a NAT device on the routing path, since the destination EP sends the packets back to the correct destination port (e.g., which is the source port of the source EP's side) and not destination port 4500, the NAT device may drop the return traffic as it expects a different destination port, such as destination port 4500. To address this issue and prevent the return traffic from being dropped by the NAT device, some embodiments may set a flag (e.g., by the IKE module) upon detection of the NAT device on the routing path. For example, the IKE module of the source EP may set a flag upon detection of a NAT device on the routing path and inform the IKE module of the destination EP of the existence of the NAT device. This way, the NAT device won't drop the return packets if the destination port of the return packets is the source port that was originally used by the source EP (and not port 4500). Additionally, the probing module of the destination EP, in some embodiments, also may need to use the correct destination port (e.g., instead of port 4500) for probing packets to guarantee that the selected source port maps to the desired path, as the path is in part selected based on the destination port. This may additionally require changes to the path in the network to accept non-4500 ports as well as firewall settings in the network to accept non-4500 ports.

Figure 4:
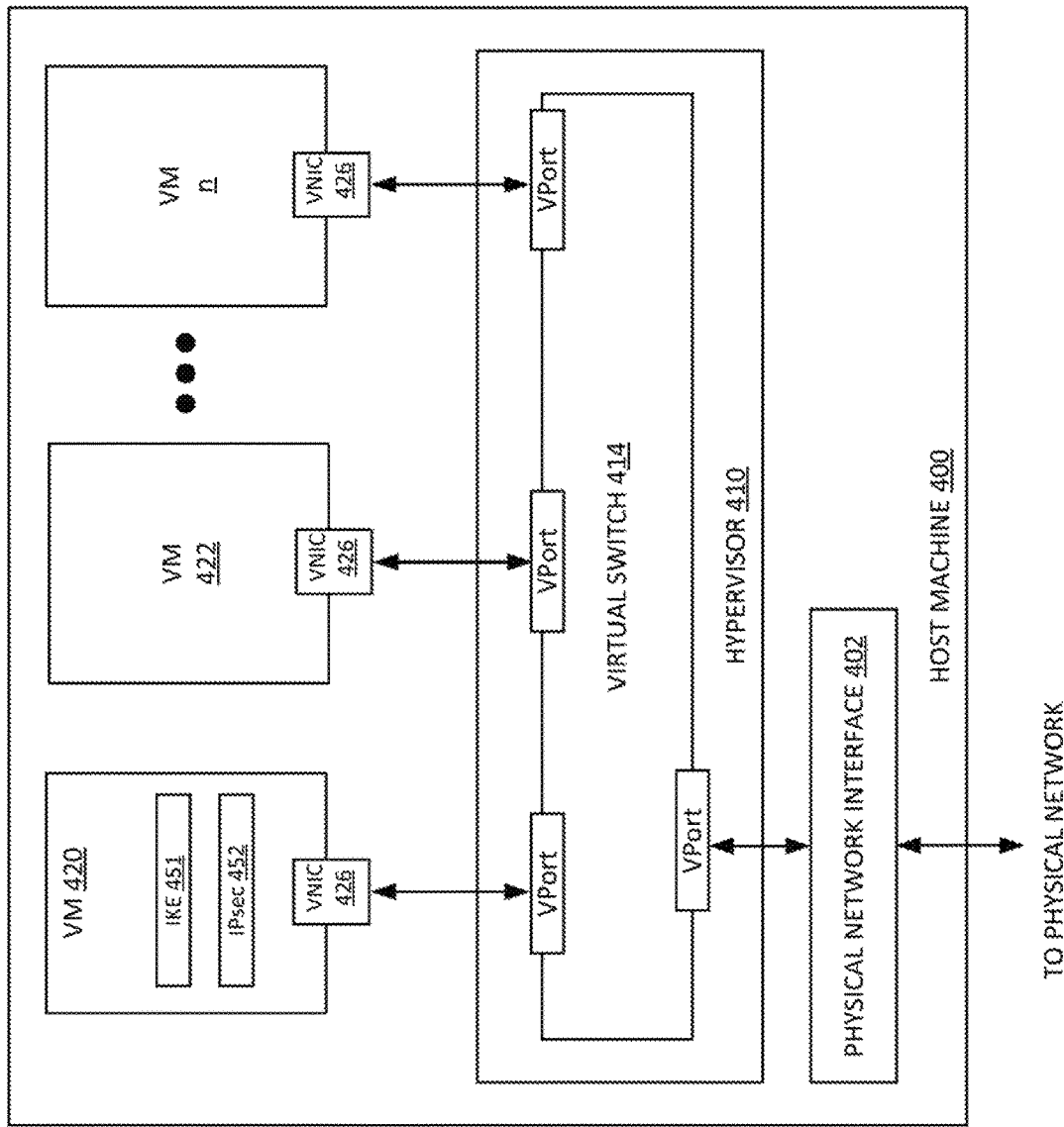
FIG. 4 is a block diagram illustrating a host machine of a virtualized network environment that includes an IPSec endpoint, according to an example embodiment of the present application.

FIG. 4 is a block diagram illustrating a host machine of a virtualized network environment that includes an IPSec endpoint, according to an example embodiment of the present application. As illustrated, host machine 400 may include a physical network interface controller (PNIC) 402, a hypervisor 410, and several different virtual machines VM 420, VM 422 . . . VM n.

Host machine 400 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance) or physical computing devices. In certain embodiments, host machine 400 may be a physical general purpose computer (e.g., a server, workstation, etc.) and may include one or more physical central processing units (CPUs), system memory, and non-volatile data storage, in addition to one or more physical network interfaces, such as PNIC 402, for communication with other hardware computing platforms, entities, or host machines on a physical network accessible through PNIC 402.

Hypervisor 410 may serve as an interface between the VMs and PNIC 402, as well as other physical resources available on host machine 400. Each VM 420 to VM n is shown including a virtual network interface card (VNIC) 426, which is responsible for exchanging packets between the VM and hypervisor 410. Though shown as included in the VMs, it should be noted that VNICs 426 may be implemented by code, such as VM monitor (VMM) code, associated with hypervisor 410. VMM code, in some embodiments, may be part of the host code that is provided as part of hypervisor 410, meaning that a VNIC 426 is not executed by VM's code, also referred to as guest code. VNICs 426 may be, in some cases, a software implementation of a physical network interface card. Each VM may be connected to a virtual port (vport) provided by virtual switch 414 through the VM's associated VNIC 426. Virtual switch 414 may serve as a physical network switch (e.g., serving as an edge device on the physical network), but may be implemented in software. Virtual switch 414 may be connected to PNIC 402 to allow network traffic to be exchanged between VMs 220-n executing on host machine 400 and destinations on an external physical network. Additionally, VMs 220-n may exchange network traffic amongst each other through virtual switch 414.

In some embodiments, VM 420 may be configured to perform the functions of a tunnel endpoint (TEP). For example, VM 420 may include a TEP component or module (not shown) that implements TEP functions. A TEP component may be referred to a set of instructions that configure VM 420 to perform TEP functions. VM 420 may also be configured to implement IPSec protocols and functionality using, for example, an IPSec layer or component 452 ("IPSec 452"). More specifically, IPSec 452 may encrypt outgoing packets destined for a certain destination EP by encapsulating them with, for example, ESP headers based on a corresponding security association. In each packet's ESP header, IPSec 452 may include different IPSec header values, such as an SPI value, that are associated with the SA and that are generated or configured by the IKE layer or component 451 ("IKE 451") through an IKE negotiation performed between IKE 451 and an IKE component of a destination EP (or TEP). IPSec 252 may also be configured to decrypt incoming IPSec encrypted packets received from a source IPSec EP. As discussed above, IKE 451 may be responsible for performing IKE negotiations with other IKE components of other network entities (e.g., through a network plane) to generate encryption/decryption keys and other IPSec configuration parameters. In some embodiments, IKE 451 may also be responsible for defining/maintain a source port pool, such as source port pool 250 described above, with reference to FIG. 2.

It is important to note that, typically, to add an extra level of security, the IPSec framework may require that security associations between EPs change periodically (e.g., after a certain amount of time, after a certain amount of data has been exchanged, etc.), meaning that the configuration parameters (or values) associated with the changing security associations (SAs) may change periodically as well. In such situations, after determining that a certain configuration value associated with a certain SA needs to be changed, IKE 451 may either use the same value, previously used for the security association, or may use a new value when generating the new SA configuration.

Figure 5:
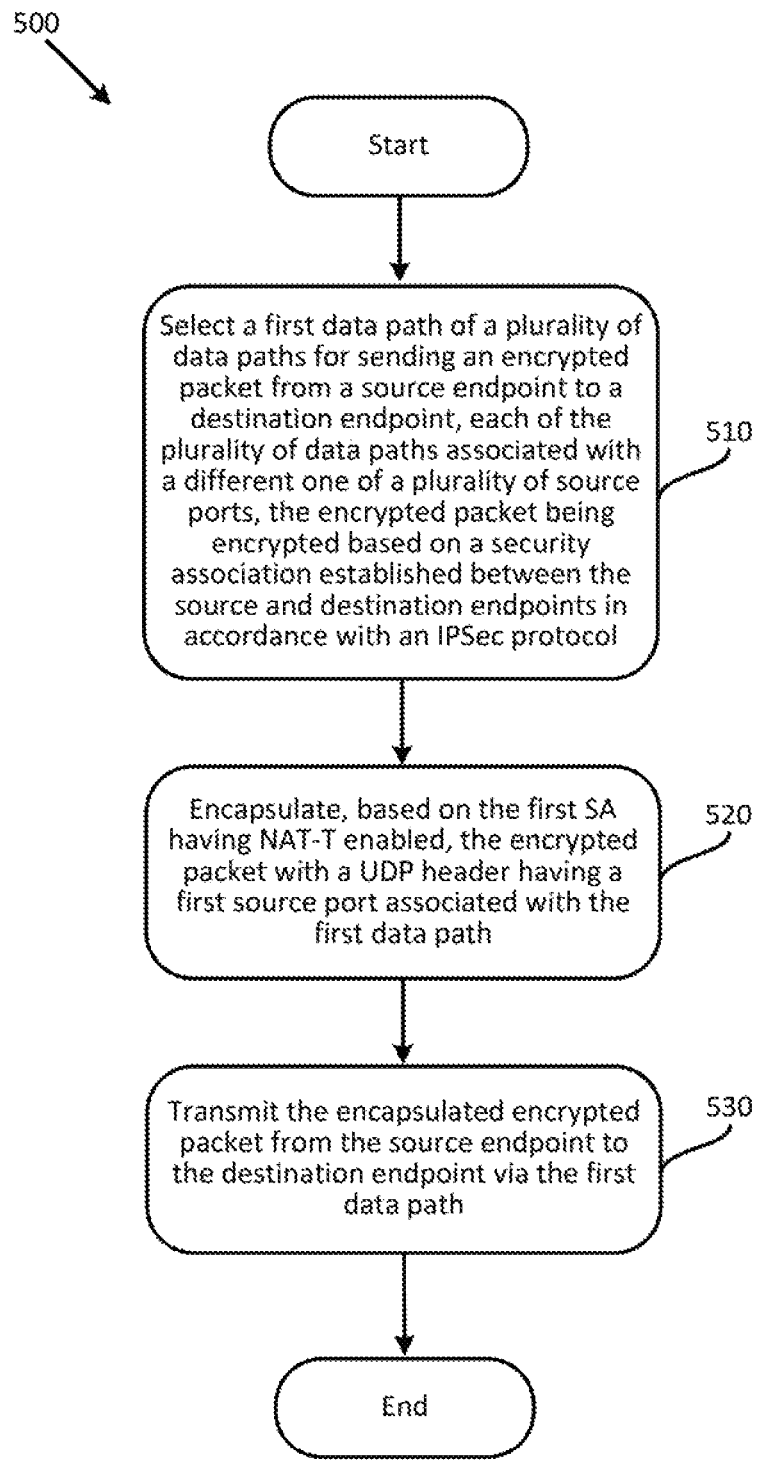
FIG. 5 is a flowchart illustrating an example process/method for identifying multiple paths and selecting one of the identified paths for sending IPSec packets from a source endpoint to a destination endpoint, according to an example embodiment of the present application.

FIG. 5 is a flowchart illustrating an example process/method 500 for identifying multiple paths (or routing paths) and selecting one of the identified paths for sending IPSec packets from a source endpoint to a destination endpoint, according to an example embodiment of the present application. In some embodiments, process 500 may be performed by an IKE module, such as IKE module 451 shown in FIG. 4. In some other embodiments, the process may be performed by a combination of IKE module 451 and IPSec module 452. In yet other embodiments, process 500 may be performed by another module within the EP.

Process 500 may begin, at 510, by selecting a first path of a plurality of paths for sending an encrypted packet from the source endpoint to the destination endpoint. The encrypted packet may be encrypted based on a security association (SA) established between the source endpoint and the destination endpoint in accordance with an IPSec protocol. In some embodiments, each of the plurality of paths is associated with a different one of a plurality of source ports. The process may maintain, for the SA, a mapping of the plurality of source ports to the plurality of paths (e.g., as described above, with reference to FIG. 2).

After selecting the path, process 500 may encapsulate, at 520, the encrypted packet with a user datagram protocol (UDP) header having a first source port associated with the first path based on the SA having network address translation traversal (NAT-T) enabled. In some embodiments, the process may encapsulate the encrypted packet with the UDP header that has a fixed source port subsequent to enabling the NAT-T. The process may then replace the fixed source port in the UDP header with the first source port from the plurality of source ports (e.g., as described above, with reference to FIGS. 2 and 3A-3C).

At 530, process 500 may transmit the encapsulated encrypted packet from the source endpoint to the destination endpoint via the selected first path. The process may then end. In some embodiments, for selecting the first path, process 500 may receive an indication of a subset of the plurality of paths as qualified paths from the destination endpoint, and after determining that the received subset includes the first path, select the first path. In some embodiments, for selecting the first path, process 500 may probe the plurality of paths by sending probing packets to the destination endpoint, the probing packets having a destination port number associated with the destination endpoint, but different source port numbers associated with the plurality of source ports. The process may probe the plurality of paths by determining a quality of each path in the plurality of paths by measuring at least one of latency, liveliness, throughput, or packet loss associated with the path. The process may then select the first path based on such a probing.

As described above, in some embodiments, after transmitting the encrypted packet, process 500 may determine (e.g., based on a periodic probing of the plurality of paths) that a second path in the plurality of paths is more qualified than the first path. As such, the process may encapsulate the subsequent encrypted packets (e.g., of the same flow) with the UDP header having a second source port (e.g., from the plurality of source ports) that is associated with the second path. Process 500 may then transmit the subsequent encrypted packets to the destination endpoint via the second path.

In some embodiments, a source endpoint may send multiple IPSec flows (e.g., inner flows) to a destination endpoint. The different inner flows may be initiated by the same application, or different applications, running on the source endpoint. In such a case, process 500 may load balance the inner flows between the different inner flows by transmitting each IPSec inner flow using a separate path. That is, the process may encapsulate a first set of the plurality of encrypted packets that is associated with a first data flow with a UDP header that has the first source port associated with the first path and encapsulate a second set of the plurality of encrypted packets that is associated with a second data flow with a UDP header that has a second source port associated with the second path. The process may then transmit the first set of encapsulated encrypted packets to the destination endpoint via the first path and the second set of encapsulated encrypted packets to the destination endpoint via the second path. In some embodiments, in order to determine to which inner flow the data packets belong (e.g., since the original different source ports have already been encrypted), the process may capture the source ports and other required data form the packets before the packets are encrypted. In some such embodiments, the process may attach the captured data as metadata of the packets. This way, each packet of a different flow may be load balanced to a different path.

In host machine 400, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments, as described above, may involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for selecting between a plurality of paths for sending an encrypted packet from a source endpoint to a destination endpoint, comprising:
    selecting, at the source endpoint, a first source port, of a plurality of source ports, associated with a first path of the plurality of paths for sending the encrypted packet from the source endpoint to the destination endpoint, wherein each source port of the plurality of source ports is associated with a different path of the plurality of paths for sending the encrypted packet from the source endpoint to the destination endpoint, and wherein the encrypted packet is encrypted based on a security association (SA) established between the source endpoint and the destination endpoint in accordance with an Internet Protocol (IP) Security (IPSec) protocol;
    determining, at the source endpoint, network address translation traversal (NAT-T) is enabled for the SA;
    based on the determining that NAT-T is enabled for the SA, encapsulating, at the source endpoint, the encrypted packet with a user datagram protocol (UDP) header having the first source port associated with the first path; and
    transmitting the encapsulated encrypted packet from the source endpoint to the destination endpoint via the first path.

2. The method of claim 1, further comprising maintaining, for the SA, a mapping of the plurality of source ports to the plurality of paths.

3. The method of claim 1, wherein encapsulating the encrypted packet comprises:
    encapsulating the encrypted packet with the UDP header having a fixed source port subsequent to enabling the NAT-T; and
    replacing the fixed source port in the UDP header with the first source port.

4. The method of claim 1, further comprising:
    receiving an indication of a subset of the plurality of paths as qualified paths from the destination endpoint, the subset including the first path, wherein selecting the first source port associated with the first path is based on receiving the indication.

5. The method of claim 1, further comprising:
    after transmitting the encrypted packet, determining, based on probing the plurality of paths, that a second path of the plurality of paths is more qualified than the first path;
    encapsulating subsequent encrypted packets with a second UDP header having a second source port, of the plurality of source ports, associated with the second path; and
    transmitting the subsequent encrypted packets to the destination endpoint via the second path.

6. The method of claim 1, wherein the encrypted packet is a first encrypted packet of a plurality of encrypted packets associated with first and second data flows, further comprising:
    selecting a second path of the plurality of paths;
    encapsulating a first set of encrypted packets of the plurality of encrypted packets that is associated with the first data flow with the UDP header having the first source port associated with the first path;
    encapsulating a second set of encrypted packets the plurality of encrypted packets that is associated with the second data flow with a second UDP header having a second source port associated with the second path;
    transmitting the first set of encapsulated encrypted packets to the destination endpoint via the first path; and
    transmitting the second set of encapsulated encrypted packets to the destination endpoint via the second path.

7. The method of claim 1, wherein selecting the first source port associated with the first path comprises:
    probing the plurality of paths by sending probing packets to the destination endpoint, the probing packets having a destination port number associated with the destination endpoint and having different source port numbers associated with the plurality of source ports; and
    selecting the first source port associated with the first path based on the probing.

8. The method of claim 7, wherein probing the plurality of paths comprises determining a quality of each path in the plurality of paths by measuring at least one of latency, liveliness, throughput, or packet loss associated with the path.

9. A non-transitory computer readable medium comprising instructions that, when executed by one or more processors of a computing system, cause the computing system to perform a method for selecting between a plurality of paths for sending an encrypted packet from a source endpoint to a destination endpoint, the method comprising:
    selecting, at the source endpoint, a first source port, of a plurality of source ports, associated with a first path of the plurality of paths for sending the encrypted packet from the source endpoint to the destination endpoint, wherein each source port of the plurality of source ports is associated with a different path of the plurality of paths for sending the encrypted packet from the source endpoint to the destination endpoint, and wherein the encrypted packet is encrypted based on a security association (SA) established between the source endpoint and the destination endpoint in accordance with an Internet Protocol (IP) Security (IPSec) protocol;
    determining, at the source endpoint, network address translation traversal (NAT-T) is enabled for the SA;
    based on the determining that NAT-T is enabled for the SA, encapsulating, at the source endpoint, the encrypted packet with a user datagram protocol (UDP) header having the first source port associated with the first path; and transmitting the encapsulated encrypted packet from the source endpoint to the destination endpoint via the first path.

10. The non-transitory computer readable medium of claim 9, the method further comprising maintaining, for the SA, a mapping of the plurality of source ports to the plurality of paths.

11. The non-transitory computer readable medium of claim 9, wherein encapsulating the encrypted packet comprises:
encapsulating the encrypted packet with the UDP header having a fixed source port subsequent to enabling the NAT-T; and
replacing the fixed source port in the UDP header with the first source port.

12. The non-transitory computer readable medium of claim 9, the method further comprising:
receiving an indication of a subset of the plurality of paths as qualified paths from the destination endpoint, the subset including the first path, wherein selecting the first source port associated with the first path is based on receiving the indication.

13. The non-transitory computer readable medium of claim 9, the method further comprising:
after transmitting the encrypted packet, determining, based on probing the plurality of paths, that a second path of the plurality of paths is more qualified than the first path;
encapsulating subsequent encrypted packets with a second UDP header having a second source port, of the plurality of source ports, associated with the second path; and
transmitting the subsequent encrypted packets to the destination endpoint via the second path.

14. The non-transitory computer readable medium of claim 9, wherein the encrypted packet is a first encrypted packet of a plurality of encrypted packets associated with first and second data flows, the method further comprising:
selecting a second path of the plurality of paths;
encapsulating a first set of encrypted packets of the plurality of encrypted packets that is associated with the first data flow with the UDP header having the first source port associated with the first path;
encapsulating a second set of encrypted packets the plurality of encrypted packets that is associated with the second data flow with a second UDP header having a second source port associated with the second path;
transmitting the first set of encapsulated encrypted packets to the destination endpoint via the first path; and
transmitting the second set of encapsulated encrypted packets to the destination endpoint via the second path.

15. The non-transitory computer readable medium of claim 9, wherein selecting the first source port associated with the first path comprises:
probing the plurality of paths by sending probing packets to the destination endpoint, the probing packets having a destination port number associated with the destination endpoint and having different source port numbers associated with the plurality of source ports; and
selecting the first source port associated with the first path based on the probing.

16. A computer system, comprising:
a memory; and
a processor coupled to the memory, the processor being configured to:
select, at a source endpoint, a first source port, of a plurality of source ports, associated with a first path of a plurality of paths for sending an encrypted packet from the source endpoint to a destination endpoint, wherein each source port of the plurality of source ports is associated with a different path of the plurality of paths for sending the encrypted packet from the source endpoint to the destination endpoint, and wherein the encrypted packet is encrypted based on a security association (SA) established between the source endpoint and the destination endpoint in accordance with an Internet Protocol (IP) Security (IPSec) protocol;
determine, at the source endpoint, network address translation traversal (NAT-T) is enabled for the SA;
based on the determining that NAT-T is enabled for the SA, encapsulating, at the source endpoint, the encrypted packet with a user datagram protocol (UDP) header having the first source port associated with the first path; and
transmit the encapsulated encrypted packet from the source endpoint to the destination endpoint via the first path.

17. The computer system of claim 16, wherein the processor is further configured to:
maintain, for the SA, a mapping of the plurality of source ports to the plurality of paths.

18. The computer system of claim 16, wherein encapsulating the encrypted packet comprises:
encapsulating the encrypted packet with the UDP header having a fixed source port subsequent to enabling the NAT-T; and
replacing the fixed source port in the UDP header with the first source port.

19. The computer system of claim 16, wherein the processor is further configured to:
receive an indication of a subset of the plurality of paths as qualified paths from the destination endpoint, the subset including the first path, wherein selecting the first source port associated with the first path is based on receiving the indication.

20. The computer system of claim 16, wherein the processor is further configured to:
after transmitting the encrypted packet, determine, based on probing the plurality of paths, that a second path of the plurality of paths is more qualified than the first path;
encapsulate subsequent encrypted packets with a second UDP header having a second source port, of the plurality of source ports, associated with the second path; and
transmit the subsequent encrypted packets to the destination endpoint via the second path.

21. The method of claim 1, wherein the encapsulating the encrypted packet with the UDP header having the first source port associated with the first path is at an Internet protocol (IP) security (IPSec) module of the source endpoint.

22. The method of claim 1, wherein the encapsulating the encrypted packet with the UDP header having the first source port associated with the first path is before network address translation (NAT) and translation of a source port in the UDP header.

* * * * *